(12) United States Patent
Asano et al.

(10) Patent No.: US 8,738,495 B2
(45) Date of Patent: May 27, 2014

(54) PERSONAL ACCOUNT MANAGEMENT DEVICE AND METHOD FOR FINANCIAL TRANSACTION

(75) Inventors: Motoshi Asano, Tokyo (JP); Shinsuke Yoshioka, Kanagawa (JP); Tetsuya Anno, Kanagawa (JP); Yoshinori Komai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1722 days.

(21) Appl. No.: 10/182,016

(22) PCT Filed: Nov. 26, 2001

(86) PCT No.: PCT/JP01/10280
§ 371 (c)(1),
(2), (4) Date: Nov. 29, 2002

(87) PCT Pub. No.: WO02/42967
PCT Pub. Date: May 30, 2002

(65) Prior Publication Data
US 2003/0163419 A1    Aug. 28, 2003

(30) Foreign Application Priority Data

Nov. 24, 2000 (JP) ................................. 2000-358560
Nov. 21, 2001 (JP) ................................. 2001-356574

(51) Int. Cl.
*G06Q 40/00*      (2012.01)
(52) U.S. Cl.
USPC ......................................... 705/36 R; 705/35
(58) Field of Classification Search
USPC ................................................... 705/35–44
See application file for complete search history.

(56) References Cited

U.S. PATENT DOCUMENTS

| | | | | |
|---|---|---|---|---|
| 4,774,664 A | * | 9/1988 | Campbell et al. | 705/38 |
| 4,885,685 A | * | 12/1989 | Wolfberg et al. | 705/14 |
| 5,305,434 A | * | 4/1994 | Ballard et al. | 715/854 |
| 5,615,109 A | * | 3/1997 | Eder | 705/8 |
| 5,952,638 A | * | 9/1999 | Demers et al. | 235/379 |

(Continued)

FOREIGN PATENT DOCUMENTS

| | | |
|---|---|---|
| JP | 57-201956 A | 12/1982 |
| JP | 08-241356 A | 9/1996 |

(Continued)

OTHER PUBLICATIONS

International Search Report dated Dec. 25, 2001, issued in International Application No. PCT/JP01/10280.

*Primary Examiner* — Rajesh Khattar
(74) *Attorney, Agent, or Firm* — Finnegan, Henderson, Farabow, Garrett & Dunner, L.L.P.

(57) ABSTRACT

This invention relates to an apparatus for managing personal accounts. The apparatus comprises a database (C), a database-updating section (D). The database (C) stores at least personal IDs allocated to individuals, respectively, payment data associated with each personal ID, receipt data associated with each personal ID, and rank data associated with each personal ID. The database-updating section (D) determines a rank for each personal ID, from the payment data and the receipt data, and records the rank as the rank data. The apparatus reliably determines the state of the financial transaction of each client, i.e., the receipt data and payment data about the transaction, correctly evaluates the contribution of the client, and provides special services to the client, by setting interests and charges that are as favorable as possible to the client.

11 Claims, 15 Drawing Sheets

(56) References Cited

U.S. PATENT DOCUMENTS

| | | | |
|---|---|---|---|
| 6,014,645 A * | 1/2000 | Cunningham | 705/38 |
| 6,088,367 A * | 7/2000 | Skells | 370/468 |
| 6,535,855 B1 * | 3/2003 | Cahill et al. | 705/1 |
| 6,820,061 B2 * | 11/2004 | Postrel | 705/14.27 |
| 7,216,299 B2 | 5/2007 | Knight | 715/764 |
| 2002/0019739 A1 * | 2/2002 | Juneau et al. | 705/1 |
| 2002/0083215 A1 * | 6/2002 | Nakagawa | 709/317 |
| 2003/0046222 A1 * | 3/2003 | Bard et al. | 705/38 |
| 2006/0206413 A1 * | 9/2006 | Van Luchene et al. | 705/37 |

FOREIGN PATENT DOCUMENTS

| | | |
|---|---|---|
| JP | 3033909 U | 11/1996 |
| JP | 10-116305 A | 5/1998 |
| JP | 10-214299 A | 8/1998 |
| JP | 2000-242723 A | 9/2000 |

* cited by examiner

| PERSONAL ID | DATE | TIME | ACCOUNT NUMBER | RECEIPT DATA | PAYMENT DATA | REASON | RECORD NUMBER |
|---|---|---|---|---|---|---|---|
| 12331 | 2000,11,10 | 13:20 | 2354361 | 10000 | | 31 | 1101 |
| 12331 | 2000,11,10 | 13:22 | 2354361 | | 1020 | 33 | 1102 |
| 12332 | 2000,1,3 | 0:20 | 2325114 | 30000 | | 31 | 1103 |
| 12331 | 2000,6,10 | 11:20 | 2354361 | 5000 | | 31 | 1104 |

FIG.2

| PERSONAL ID | ACCOUNT NUMBER | BALANCE |
|---|---|---|
| 12331 | 2354361 | 8980 |
| 12332 | 2325114 | 30000 |
| ... | ... | ... |

| PERSONAL ID | NAME | ADDRESS |
|---|---|---|
| 12331 | SONY TARO | TOKYO-TO SHINAGAWA-KU HIGASHI-SHINAGAWA... |
| 12332 | ... | ... |
| ... | ... | ... |

FIG.6

| STANDARD P/L | SERVICE ID | PRESENT RANK | TO RANK |
|---|---|---|---|
| 20 | 1 | C | B |
| 50 | 1 | C | A |
| 50 | 2 | C | B |
| 120 | 2 | C | A |

| PERSONAL ID | SERVICE ID | RANK |
|---|---|---|
| 12331 | 1 | C |
| 12331 | 2 | C |
| 12332 | 3 | B |

FIG.7

| SERVICE ID | SERVICE ITEM NAME |
|---|---|
| 1 | ORDINARY YEN-DEPOSIT |
| 2 | FIXED YEN-DEPOSIT |
| 3 | ORDINARY FOREIGN-CURRENCY DEPOSIT |

| SERVICE ID | SERVICE ITEM | RANK | | | | | |
|---|---|---|---|---|---|---|---|
| | | A | B | C | D | E | ... |
| 1 | ORDINARY YEN-DEPOSIT | 5% | 4% | 3% | 2% | 1% | ... |
| 2 | ORDINARY FOREIGN-CURRENCY DEPOSIT | 5% | 4% | 3% | 2% | 1% | ... |
| 20 | CHARGE FOR USE OF ATM | 150 YEN | 140 YEN | 130 YEN | 120 YEN | 110 YEN | ... |
| 30 | ANNUAL FEE FOR USE OF CREDIT CARD | 15,000 YEN | 14,000 YEN | 13,000 YEN | 12,000 YEN | 11,000 YEN | ... |
| ... | ... | ... | ... | ... | ... | ... | ... |

FIG.8

| ALLOCATED ITEM | SERVICE ITEM | FORMULA | REMARKS |
|---|---|---|---|
| PROFIT FROM USING DEPOSIT | ORDINARY YEN-DEPOSIT | LATEST BALANCE×LATEST IN-HOUSE RATE O/N, FOR EACH MONTH | LESS INTEREST FOR ANY ITEM OTHER THAN FIXED DEPOSITS |
| | FIXED YEN-DEPOSIT | PRINCIPAL×CONTRACT DATE · PV OF THE RATE APPLIED TO THE PERIOD | |
| | ORDINARY FOREIGN-CURRENCY DEPOSIT | LATEST BALANCE×LATEST IN-HOUSE RATE O/N×LATEST TTB | LESS INTEREST FOR ANY ITEM OTHER THAN FIXED DEPOSITS |
| | FIXED FOREIGN-CURRENCY DEPOSIT | PRINCIPAL×CONTRACT DATE · PV OF THE RATE APPLIED TO THE PERIOD×TTB FOR THE CONTRACT DATE | |
| | ... | ... | |
| PROFIT FROM INTEREST ON LOAN | CARD LOAN | LATEST BALANCE×LATEST IN-HOUSE RATE O/N | |
| | HOUSING LOAN AT A FIXED INTEREST RATE | PRINCIPAL×CONTRACT DATE · RATE APPLIED TO THE PERIOD | |
| | HOUSING LOAN AT A FLOATING INTEREST RATE | PRINCIPAL×CONTRACT DATE · RATE APPLIED TO THE PERIOD | |
| | ... | ... | |
| VARIOUS CHARGES | CHARGE FOR REMITTANCE | ACTUAL CHARGE | |
| | CHARGE FOR ISSUING A TRANSACTION STATEMENT | | |
| | ... | ... | |

FIG.9

| ALLOCATED ITEM | SERVICE ITEM | FORMULA | REMARKS |
|---|---|---|---|
| PAYMENT OF INTEREST ON DEPOSITS | ORDINARY YEN-DEPOSIT | INTEREST MULTIPLIER | |
| | FIXED YEN-DEPOSIT | NONE | |
| | ORDINARY FOREIGN-CURRENCY DEPOSIT | IF TOTAL AMOUNT: ERASE PL VALUE FOR SERVICE ITEM IF A PARTIAL AMOUNT: ERASE TOTAL AMOUNT TEMPORARILY | |
| | FIXED FOREIGN-CURRENCY DEPOSIT | NONE | |
| | ... | ... | ... |
| PAYMENT OF INTEREST ON LOANS | LOANS AT FIXED RATES | BALANCE×IN-HOUSE RATE APPLIED TO CONTRACT DATE | |
| | LOANS AT FLOATING RATES | INTEREST MULTIPLIER (IN-HOUSE RATE) | |
| LABOR COST | CREDIT EXAMINATION | ALLOCATE LABOR UNIT COST OBTAINED BY DIVIDING AN AMOUNT BY (CARD LOAN OFFERED WHEN THE MAXIMUM IS CHANGED OR WHEN THE LOAN IS GUARANTEED)+(BALANCE AT THE FIFTH DAY OF DELAYED REPAYMENT) | MAXIMUM CARD LOAN IS CHANGED WHEN THE CLIENT ASKS FOR AN INCREASE OR WHEN THE RENEWAL IS IMPOSSIBLE (CARD LOAN INCLUDES A CREDIT-CARD LOAN) |
| | CALL CENTERS: OPERATOR | TELEPHONING TIME (ACD+ACW)×(UNIT COST OF OPERATOR+SV FEE)×CORRECTION COEFFICIENT | CORRECTION COEFFICIENT: CALCULATED FROM THE TARGET NUMBER OF CALLS TO RECEIVE AT THE CALL CENTER UNIT COST: CALCULATED FROM BREAK-EVEN POINT AND ACTUAL PROFIT |
| | : ADMISSION | UNIT COST FOR ADMISSION | INCLUDING MANAGER |
| | : CLERICAL WORK AT MAIN OFFICE | UNIT COST FOR ALLOCATING ACCOUNT NUMBER | UNIT CHARGE: CALCULATED AT 70% OF THE DATA-PROCESSING CAPACITY |
| SYSTEM-RUNNING COST CHANNEL-RELATED COST | MEMBERSHIP WEB | NUMBER OF ACCESSES TO WEB×UNIT CHARGE | |
| | ... | ... | ... |
| FACILITY COST | FACILITY OF MAIN OFFICE | UNIT COST FOR ALLOCATING ACCOUNT NUMBER | LEASE, ELECTRICITY AND FUEL EXPENSES, FACILITIES, ETC. |
| | ... | ... | ... |
| COMMUNICATIONS LINE COST | ATM | NUMBER OF TIMES×UNIT CHARGE | |
| | MISCELLANEOUS COST | UNIT COST FOR ALLOCATING ACCOUNT NUMBER | APPLIED TO INQUIRY FOR BALANCE, TOO SOCIAL EXPENSES, MEMBERSHIP FEE |
| | ... | ... | ... |

FIG.10

| PERSONAL ID | SERVICE ID | RANK |
|---|---|---|
| 12331 | 1 | C |
| 12332 | 2 | B |
| 12333 | 1 | A |
| 12334 | 3 | D |
| ... | ... | ... |

FIG.11

| RELATED ITEMS | CASE ASSUMED |
|---|---|
| ORDINARY YEN-DEPOSIT | ACCOUNT OPENED, INTEREST RATE OF 0.001% (IN-HOUSE RATE), ANNUAL RATE OF 0.03% (APPLICABLE TO CLIENT) |
| FIXED YEN-DEPOSIT | CONTRACTED FOR 3 MILLION YEN ON OCT. 10, AT ANNUAL RATE OF 3%(IN-HOUSE RATE), OR 2% (APPLIED TO CLIENT) |
| CARD LOAN | 0.2 MILLION YEN TO CLIENT ON OCT. 1, REPAID ON OCT. 2, ANNUAL RATE OF 6.5%, NO BALANCE BEFORE OCT. 1 |
| ATM | DEPOSITED THREE TIMES (OCT. 1, OCT. 15 AND OCT. 20) |
| CALL CENTER | INQUIRY TO CALL CENTER ON OCT. 30 BY TELEPHONE, SPENDING 30 MINUTES, AND OPERATOR SPENDS 10 MINUTES IN CLERICAL WORK AFTER TALKING WITH THE CLIENT |
| ACCESS TO WEB | 5 ACCESSES |

FIG.12

| DATE | TRANSACTION | CATEGORY |
|---|---|---|
| OCT. 1 | DEPOSIT AT ATM (10 MILLION YEN) | ATM |
| OCT. 1 | LOG-IN AT MEMBERSHIP WEB SITE | ACCESS TO WEB |
| OCT. 1 | CARD LOAN OFFERED (PRINCIPAL: 0.2 MILLION YEN) | CARD LOAN |
| OCT. 2 | CARD LOAN REPAID (TOTAL AMOUNT) | CARD LOAN |
| OCT. 6 | LOG-IN AT MEMBERSHIP WEB SITE | ACCESS TO WEB |
| OCT. 10 | FIXED DEPOSIT MADE (3 MILLION YEN) | FIXED YEN-DEPOSIT |
| OCT. 14 | LOG-IN AT MEMBERSHIP WEB SITE | ACCESS TO WEB |
| OCT. 15 | WITHDRAWING AT ATM (2 MILLION YEN) | ATM |
| OCT. 20 | WITHDRAWING AT ATM (0.3 MILLION YEN) | ATM |
| OCT. 30 | INQUIRY MADE TO CALL CENTER (TELEPHONE TIME: 30MINUTES, POST-CLERICAL WORK: 10MINUTES) | CALL CENTER |
| OCT. 31 | LOG-IN AT MEMBERSHIP WEB SITE | ACCESS TO WEB |
| OCT. 31 | LOG-IN AT MEMBERSHIP WEB SITE | ACCESS TO WEB |

FIG.13

| BALANCE | SERVICE ITEM | | FORMULA | CASE |
|---|---|---|---|---|
| ORDINARY PROFIT | INTEREST ON DEPOSITS | INTEREST ON ORDINARY YEN-DEPOSITS | BALANCE×IN-HOUSE RATE O/N×(LAST DAY OF THE CALCULATION PERIOD−FIRST DAY THEREOF) | (10 MILLION YEN×0.0001%)×(OCT. 10−OCT. 2)+ (7 MILLION YEN×0.0001%)×(OCT. 15−OCT. 11)+ (5 MILLION YEN×0.0001%)×(OCT. 20) |
| | | INTEREST ON FIXED YEN-DEPOSITS | (PRINCIPAL×CONTRACT DATE · IN-HOUSE ANNUAL RATE IN THE PERIOD÷365)×(LAST DAY OF THE CALCULATION PERIOD−FIRST DAY THEREOF) | ((3 MILLION YEN×3%)÷365)×(OCT. 31−OCT. 11) =4,932 YEN |
| | INTEREST ON CARD LOANS | CARD LOANS | LATEST BALANCE×(LAST DAY OF THE CALCULATION PERIOD−FIRST DAY THEREOF)×(LATE APPLIED ON THE CONTRACT DATE FOR THE CLIENT÷365) | 0.2 MILLION YEN×ONE DAY÷365×6.5% =36 YEN |
| | CHARGES | CHARGE FOR REMITTANCE | ACTUAL CHARGE | 0 YEN |
| | | CHARGE FOR REBOUND IN REMITTANCE | ACTUAL CHARGE | 0 YEN |
| | | CHARGE FOR CHANGE IN REMITTANCE | ACTUAL CHARGE | 0 YEN |
| | | CHARGE FOR USE OF ATM (AUTOMATIC TELLER MACHINE) | ACTUAL CHARGE | THREE TIMES×105 YEN=315YEN |
| | | CHARGE FOR THE FIRST USE OF CARD LOAN | ACTUAL CHARGE | 0 YEN |

FIG.14A

| ORDINARY LOSS | INTEREST ON DEPOSITS | INTEREST ON ORDINARY YEN-DEPOSITS | (LATEST BALANCE×ANNUAL RATE OF ORDINARY DEPOSIT÷365)×(LAST DAY OF THE CALCULATION PERIOD−FIRST DAY THEREOF) | (10 MILLION YEN×0.03%÷365)×(OCT. 10−OCT. 2)+ (7 MILLION YEN×0.03%÷365)×(OCT. 15−OCT. 11)+ (5 MILLION YEN×0.03%÷365)×(OCT. 20) |
|---|---|---|---|---|
| | | INTEREST ON FIXED YEN-DEPOSITS | (PRINCIPAL×CONTRACT DATE · ANNUAL RATE APPLIED TO THE PERIOD÷365)×(LAST DAY OF THE CALCULATION PERIOD−FIRST DAY THEREOF) | ((1 MILLION YEN×2%)÷365)×(OCT. 31−OCT. 11) =3,288 YEN |
| | INTEREST ON CARD LOAN | CARD LOANS | INTEREST MULTIPLIER BEFORE RENEWAL+LATEST BALANCE×(LAST DAY OF THE CALCULATION PERIOD−FIRST DAY THEREOF)×IN-HOUSE RATE O/N÷365 | 0.2 MILLION YEN×ONE DAY÷365×3% =16 YEN |
| | COSTS RELATED TO ASSETS | RESERVE AT THE BANK OF JAPAN | ORDINARY YEN-DEPOSIT | AVERAGE BALANCE×FIXED RATE×IN-HOUSE RATE (EX. 1.7%) | 1.8 MILLION YEN×1.7%×3%=900 YEN |
| | | CARD LOAN GUARANTEE FEE | | AVERAGE BALANCE×FIXED RATE (EX. 11%) | 0.2 MILLION YEN×11%=22,000 YEN |
| | LABOR COST | CALL CENTER | OPERATORS | TELEPHONING TIME (ACD+ACW)×((UNIT COST OF OPERATOR+SV FEE)×CORRECTION COEFFICIENT) (EX. UNIT COST OF OPERATOR=5,000 YEN) (EX. SV FEE=1,000 YEN) (EX. CORRECTION COEFFICIENT=1.1) | (30 MIN. +10 MIN. )×(5,000 YEN+ 1,000 YEN)×1.1=4,400 YEN |

FIG.14B

| ORDINARY LOSS | SYSTEM-RUNNING COST | CHANNEL-RELATED COST | MEMBERSHIP WEB | NUMBER OF ACCESSES WEB×CHARGE (EX. 10 YEN/ACCESS) | 5 ACCESSES×10 YEN=50 YEN |
|---|---|---|---|---|---|
| | | | MAILS | (TIMES OF TRANSMISSION+TIMES OF RECEPTION)×CHARGE (EX. 10 YEN/TRANSMISSION OR RECEPTION) | 3 TIMES×10 YEN=30 YEN |
| | | | IVR·VOICE SYNTHESIS | NUMBER OF ACCESSES×CHARGE (EX. 6 YEN/ACCESS) | ONE ACCESS×6 YEN=6 YEN |
| | | | ATM (AT OTHER BANKS) | NUMBER OF ACCESSES×CHARGE (EX. 1 YEN/ACCESS) | 3 TIMES×1 YEN=3 YEN |
| | | COST OF DEPOSITING AND WITHDRAWING AT ATM | | NUMBER OF ACCESSES×(CHARGE+UNIT COST) ⇨ ACCESSES TO KNOW BALANCE×(CHARGE+UNIT COST)+ ACCESSES FOR DEPOSIT×(CHARGE+UNIT COST)+ ACCESSES FOR WITHDRAWING×(CHARGE+UNIT COST) (EX. CHARGE FOR DEPOSIT=0 YEN/ACCESS) (EX. CHARGE FOF WITHDRAWING= 210 YEN/ACCESS) | 2 ACCESSES×105 YEN=210 YEN ⇨ (WITHDRAWING) |

PROFIT FROM EACH CLIENT=5,458 YEN
LOSS CONCERNING EACH CLIENT=31,047 YEN
P/L VALUE FOR EACH CLIENT=25,589 YEN

FIG.14C

| BRANCH NUMBER | 123 |
|---|---|
| ACCOUNT NUMBER | 4567890 |

| ALLOCATION CODE | ALLOCATED ITEM | RESULT |
|---|---|---|
| 1 | NUMBER OF ACCESSES TO WEB | 25 |
| 2 | NUMBER OF ACCESSES TO Imode | 15 |
| 3 | WEB CESSION TIME | 120 |
| 4 | Imode CESSION TIME | 30 |
| 5 | NUMBER OF INVESTMENT-TRUST CONTRACTS | : |
| 6 | USER OF CREDIT CARD | : |
| 7 | NUMBER OF TIMES THE CREDIT CARD HAS BEEN USED | : |
| 8 | NUMBER OF TIMES THE ATM HAS BEEN USED | : |
| 9 | NUMBER OF DEPOSITS AT THE ATM | : |
| 10 | NUMBER OF WITHDRAWN AT THE ATM | : |
| 11 | NUMBER OF REMITTANCES AT THE ATM | : |
| 12 | NUMBER OF HOUSING LOANS | : |
| 13 | NUMBER OF ALL TRANSACTIONS | : |
| 14 | NUMBER OF MAILS TRANSMITTED ABOUT ACCOUNT | : |
| 15 | NUMBER OF MAILS RECEIVED ABOUT ACCOUNT | : |
| 16 | LIST OF LOAN USERS (OFFERED BY TEIKOKU DATA INC.) | : |
| 17 | AVERAGE MONTHLY BALANCE OF ORDINARY YEN-DEPOSIT | : |
| 18 | AVERAGE MONTHLY BALANCE OF FIXED YEN-DEPOSIT | : |
| 19 | AVERAGE MONTHLY BALANCE OF ORDINARY FOREIGN-CURRENCY DEPOSIT | : |
| 20 | AVERAGE MONTHLY BALANCE OF FIXED FOREIGN-CURRENCY DEPOSIT | : |
| 21 | NUMBER OF ORDINARY ACCOUNTS | : |
| 22 | NUMBER OF ORDINARY AND FIXED DEPOSITS | : |
| 23 | NUMBER OF ORDINARY FOREIGN-CURRENCY ACCOUNTS | : |
| 24 | NUMBER OF FIXED FOREIGN-CURRENCY DEPOSITS | : |
| 25 | NUMBER OF CARD LOANS CONTRACTED | : |
| 26 | NUMBER OF LOANS FOR SPECIFIC PURPOSES | : |
| 27 | NUMBER OF HOUSING LOANS CONTRACTED | : |
| 28 | NUMBER OF TRANSACTIONS AT ORDINARY ACCOUNT | : |
| 29 | NUMBER OF TRANSACTIONS AT ORDINARY/FIXED ACCOUNT | : |
| 30 | NUMBER OF TRANSACTIONS AT ORDINARY FOREIGN-CURRENCY ACCOUNT | : |
| 31 | NUMBER OF TRANSACTIONS AT FIXED FOREIGN-CURRENCY ACCOUNT | : |
| 32 | NUMBER OF TRANSACTIONS AT ORDINARY FOREIGN-CURRENCY ACCOUNT | : |
| 33 | NUMBER OF TIMES A CARD LOAN HAS BEEN USED | : |
| 34 | NUMBER OF LOANS USED FOR SPECIFIC PURPOSES | : |
| 35 | NUMBER OF HOUSING LOANS USED | : |
| 36 | NUMBER OF DELAYED REPAYMENTS OF CARD LOAN | : |
| 37 | NUMBER OF DELAYED REPAYMENTS OF LOAN FOR A SPECIFIC PURPOSES | : |
| 38 | NUMBER OF DELAYED REPAYMENT OF HOUSING LOAN | : |

FIG.16

PERSONAL ACCOUNT MANAGEMENT DEVICE AND METHOD FOR FINANCIAL TRANSACTION

TECHNICAL FIELD

The present invention relates to an apparatus for managing personal accounts and a method for managing the same, both of which can record the particulars of financial transactions of each client and the history of the transactions between the client and the service provider and can improve the service in the financial transactions of the client. The invention also relates to a recording medium recording a program for managing personal accounts, an apparatus for providing special services to clients, a method of providing special services to clients, a recording medium recording a program for providing special services to clients, and a program for providing special services to clients.

BACKGROUND ART

Hitherto financial institutions applied the same interest on the deposit and the same charge for each service, to all their clients. They did not apply different interest or a different charge, from one client to another.

The advance in the computer technology, achieved in recent years, has made it easy for the financial institutions to manage the transactions with their clients. It is proposed that the detail of a service to offer to each client be determined from the particulars of the transaction with the client, as is disclosed in, for example, Jpn. Pat. Appln. Laid-Open Publication No. 10-214299 and Jpn. Pat. Appln. Laid-Open Publication No. 10-240832.

Jpn. Pat. Appln. Laid-Open Publication No. 10-214299 and Jpn. Pat. Appln. Laid-Open Publication No. 10-240832 disclose the technique of setting points for each client in regard to a specific service and changing the content of the service in accordance with the points set for the client. However, the points are not set based on the profit and loss concerning all transactions with the client and do not mirror the client's contribution to the financial institution. Even a client who has transacted many times with the institution and therefore paid a great amount of charges to the institution cannot be a client much contributing to the financial institute. The client may often uses the call center, thus imposing a high labor cost on the financial institution. With this technique it is impossible to determine each client's contribution to the institution, both rationally and objectively.

Further, with this technique the financial institution cannot be said to always offer a special service that the client desires. Different clients want to receive different types of services. A client who frequently deposits and withdraws money into and from his or her account wants the financial institution to reduce the charges for using the ATM system of the financial institution. On the other hand, a client who rarely withdraw money from the account wishes the institution to increase the interest on the deposit.

DISCLOSURE OF THE INVENTION

The present invention has been made in view of the foregoing. An object of the invention is to provide an apparatus, a method and a recording medium, which helps financial institutions to determine each client's contribution, both rationally and objectively, from the profit and loss concerning all transactions with the client and to offer a special service the client really wants, in accordance with the client's contribution thus determined.

To achieve the object, a apparatus for managing personal accounts, according to the invention, comprises: a database storing at least personal IDs allocated to individuals, respectively, payment data associated with each personal ID, receipt data associated with each personal ID, and rank data associated with each personal ID; and a database-updating section for determining a rank for each personal ID, from the payment data and the receipt data, and for recording the rank as the rank data. The rank for each personal ID is determined from the payment data and the receipt data, i.e., the contribution of the client to the financial institution. Therefore, the apparatus can help the financial institution to determine each client's contribution, both rationally and objectively, from the profit and loss concerning the client. Based on the evaluation of the client the financial institution can set interest and charges at special rates, which are applied to the client.

The rank data may include at least a service ID and rank data paired with the service ID, and the rank data is associated with one service item. This makes it possible to evaluate the client with regard to each service item.

An apparatus for managing personal accounts, according to the present invention, comprises: a database storing at least personal IDs allocated to individuals, respectively, payment data associated with each personal ID, receipt data associated with each personal ID, and rank data associated with each personal ID; a candidate-selecting section for determining a plurality of rank candidates from the payment data and receipt data associated with each personal ID and for selecting at least one of the rank candidates; and database-updating section for recording the rank candidate selected by the candidate-selecting section, as the rank data. The rank may be determined from the contribution of each individual to the profit calculated from the payment data and the receipt data. Thus, the rank reliably reflects the client's contribution to the profit, calculated from the payment data and the receipt data. Based on the contribution, the services to the client can be improved.

As specified above, the apparatus for managing personal accounts includes a candidate-selecting section. The candidate-selecting section determines a plurality of rank candidate, ie., a plurality of service items that are set at ranks and can be selected. Therefore, the client can select any one of these ranked service items, in accordance with his will and intention. Further, the rank the client has acquired can be raised in accordance with his needs and can be applied to the service items of different financial transactions.

An apparatus for providing special services to clients, according to the present invention, comprises: condition-setting means for setting conditions for offering special services; rank-setting means for setting ranks of the clients on the basis of the conditions which have been set by the condition-setting means; rank-holding means for holding the ranks of the clients, which have been set by the rank-setting means; and special-service content determining means for determining the contents of special services to offer to the clients, from the ranks of the clients which have been set by the rank-setting means.

The apparatus for providing special services to clients may further comprises condition-notifying means for notifying to the clients the conditions for offering special services, which have been set by the condition-setting means. The condition-setting means sets the conditions for offering special services in accordance with what kinds of financial services the clients have bought hitherto.

The condition-setting means may set profit values concerning the clients, as the conditions for offering special services.

The condition-setting means may set loss values concerning the clients, as the conditions for offering special services.

The condition-setting means may set P/L values concerning the clients, as the conditions for offering special services.

The apparatus for providing special services to clients, according to the invention, may further comprise special-service rejecting means for rejecting special services to particular clients. In the apparatus, the clients to whom special services are rejected are those who have delayed repayment of loans.

The apparatus for providing special services to clients, according to this invention, may further comprise default-rank setting means for setting default ranks to new clients in connection with service items.

The apparatus for providing special services to clients, according to this invention, may further comprise default-rank setting means for setting default ranks to new clients in connection with service items.

The apparatus for providing special services to clients, according to the invention, may further comprise special-service notifying means for notifying to the clients the contents of the special services determined by special-service content determining means.

In the apparatus for providing special services to clients, according to the invention, the contents of the special services determined by special-service content determining means may be the interests on the financial services, which are more favorable to the clients than before.

In the apparatus for providing special services to clients, according to the invention, the contents of the special services determined by special-service content determining means may be charges on various financial transactions, which are more favorable to the clients than before.

A method of providing special services to clients, according to the present invention, comprises the steps of: setting conditions for offering special services; setting ranks of the clients on the basis of the conditions which have been set in the step of setting conditions for offering special services; holding the ranks of the clients, which have been set in the step of setting ranks of the clients; and determining the contents of special services to offer to the clients, from the ranks of the clients which have been set in the step of setting the ranks of the clients; and offering special services to the clients in accordance with the contents of special services, which have been determined in the step of determining the contents of special services.

An apparatus according to the present invention is designed to provide special services to clients identified by personal IDs that are necessary for the clients to perform financial transactions. This apparatus comprises: service-ID receiving means for receiving service IDs assigned to service items, when the clients perform the financial transactions; rank-outputting means for outputting rank data items corresponding to the clients, in accordance with the service IDs received by the service-ID receiving means and the personal IDs; special-service content determining means for determining the contents of special services to offer to the clients, from the rank data items output by the rank-outputting means; and special-service offering means for offering the clients the contents of special services, which have been determined by the special-service content determining means.

The apparatus for providing special services may further comprise an upper-rank outputting means for outputting the highest of the a plurality of rank data items which the rank-outputting means outputs and which correspond to a service ID and a personal ID.

A method according to the invention is designed to provide special services to clients identified by personal IDs that are necessary for the clients to perform financial transactions. The method comprises the steps of: receiving service IDs assigned to service items, when the clients perform the financial transactions; outputting rank data items corresponding to the clients, in accordance with the service IDs received in the step of receiving the service IDs and the personal IDs; determining the contents of special services to offer to the clients, from the rank data items output in the step of outputting the rank data items; and offering the clients the contents of special services, which have been determined by the special-service content determining means.

An apparatus for providing special services, according to the present invention, comprises: a database storing at least personal IDs allocated to individuals, respectively, profit data associated with each personal ID, loss data associated with each personal ID, and rank data associated with each personal ID, said profit data and said loss data representing the profit and loss of a financial institution; and a database-updating section for determining a rank for each personal ID, from the profit data and the loss data, and for recording the rank as the rank data. The rank data may include at least one data item composed of a service ID and rank data paired with the service ID.

An apparatus for providing special services, according to the invention, comprises: a database storing at least personal IDs allocated to individuals, respectively, profit data associated with each personal ID, loss data associated with each personal ID, and rank data associated with each personal ID; a candidate-selecting section for determining a plurality of rank candidates from the profit data and loss data associated with each personal ID and for selecting at least one of the rank candidates; and a database-updating section for recording, as the rank data, the rank candidate selected by the candidate-selecting section. In this apparatus, the rank is determined from the contribution of each individual, which has been calculated from the profit and loss of the financial institution.

In the present invention, the "personal ID" may be, for example, an account number that can identify a client uniquely. The personal ID may be a combination of the account number and the branch number. Alternatively, it may be the ID number assigned to the client, instead of the account number.

The other objects of the invention and the specific advantages of the invention will be more apparent from the following description of the embodiments.

BRIEF DESCRIPTION OF THE DRAWINGS

FIG. 2 is a table showing the receiving and paying of money, which is acquired from the transaction-service log database provided in the personal-account managing apparatus of the present invention;

FIG. 6 is a table acquired from the rank-up item extracting section provided in the personal-account managing apparatus according to the invention;

FIG. 7 is a table for explaining how the rank-updating section of the personal-account managing apparatus updates the ranks of items;

FIG. 8 illustrates a special service table recorded in the personal-account managing apparatus of the present invention;

FIG. 9 is a table that shows the standard of allocating the profit values to clients in the personal-account managing apparatus according to the invention;

FIG. 10 is a table that shows the standard of allocating the loss values to clients in the personal-account managing apparatus according to the invention;

FIG. 11 is a table acquired from the rank database provided in the personal-account managing apparatus and showing the latest ranks of the clients;

FIG. 12 is a table showing various financial transaction models for use in calculating the P/L values for the clients;

FIG. 13 shows a history of the financial transactions made with a client, which is used to calculate the P/L value for the client;

FIG. 14 is the P/L value for the client that has been calculated in accordance with a P/L-allocating standard table;

FIG. 16 is a table acquired from the analysis database incorporated in the special-service providing apparatus according this invention.

BEST MODE FOR CARRYING OUT THE INVENTION

Figure 1:
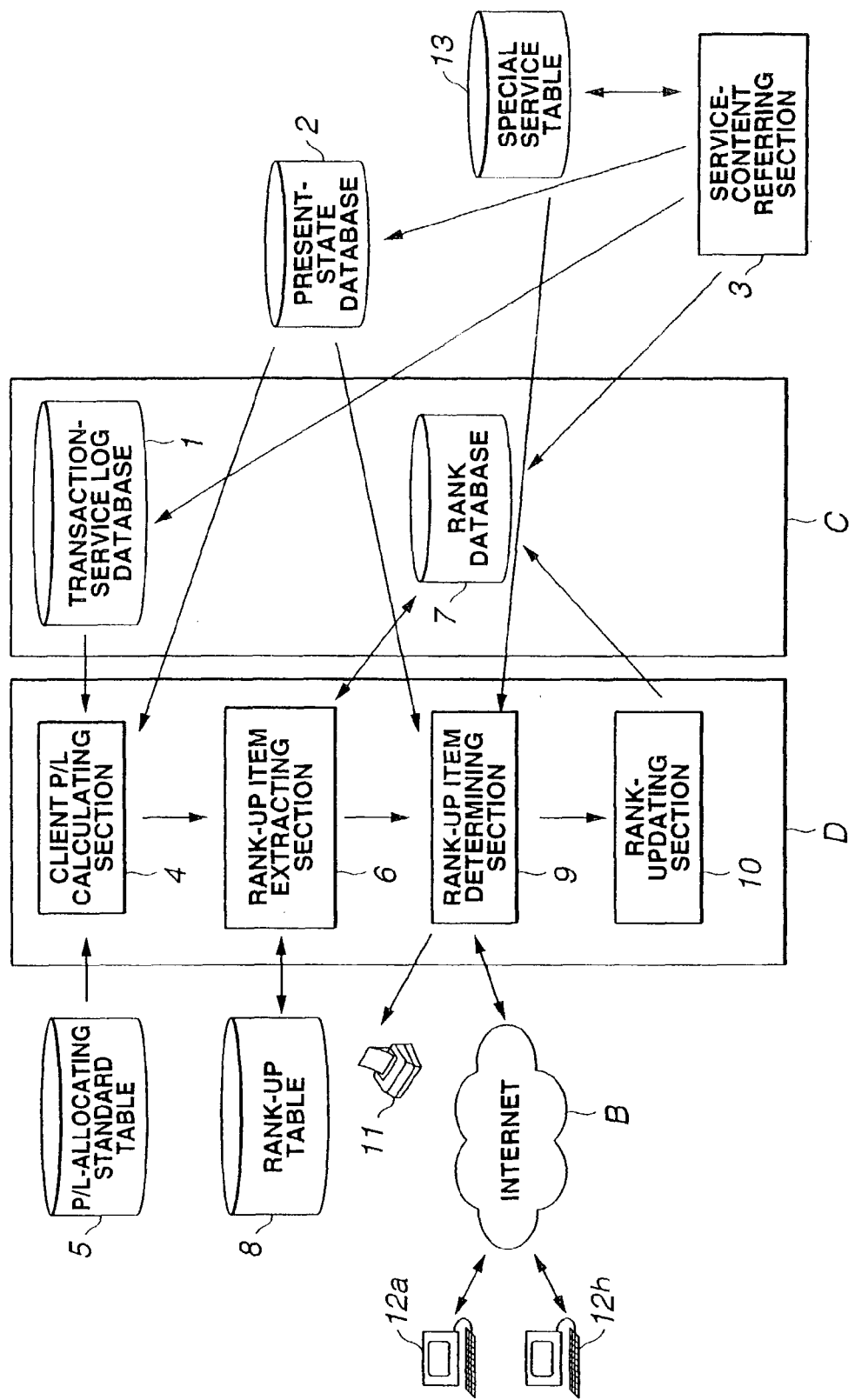
FIG. 1 is a block diagram illustrating the entire construction of a personal-account managing apparatus according to the present invention.

Embodiments of the present invention will be described with reference to the accompanying withdrawing. FIG. 1 is a block diagram showing the entire construction of a personal-account managing apparatus A according to the present invention. The personal-account managing apparatus A of the invention is connected directly to the Internet B or indirectly thereto by a gateway. The apparatus can therefore exchange information with the data terminals 12a, 12b, . . . of the clients. The personal-account managing apparatus A may be connected to the Internet in whichever mode, by radio or by a cable.

The personal-account managing apparatus A of the invention has at least a database C and a database-updating section D. The database C comprises at least a transaction-service log database 1 and a rank database 7, which contain at least the personal ID identifying each client and the payment data, receipt data and rank data all associated with the personal ID.

As FIG. 2 shows, the transaction-service log database 1 stores the data that is necessary in the process of allocating P/L (Profit/Loss) values to clients. That is, the data is used to allocate the P/L values that the financial institution has accumulated, in accordance with a log or a similar record of the transactions and services that the institution has made with and offered to the clients.

In the embodiment of the invention, the contribution that each client provides to the financial institution (an enterprise performing financial business) during a preset period shall be called, for the sake of convenience, "P/L value," i.e., the ratio of the profit to the loss, all concerning the client.

When the table shown in FIG. 2 is used, the transaction-service log database 1 records an ID that corresponds to the ID recorded in the client-data table provided in the present-state database 2, which will be described later. The record describes the personal ID, receipt data and payment data. Preferably, the record describes the reason for receiving or paying money and the date of receiving or paying the money. The word "reason" is the action the client has made, such as depositing or withdrawing money, into or from his account.

The rank database 7 records the latest rank data about each client identified by a personal ID. The database 7 may store, for example, the table shown in FIG. 3.

The transaction-service log database 1 is related to the present-state database 2, with a service-content referring section 3. The present-state database 2 records at least the personal ID assigned to each client, the account number of the client and the balance of the account, which are associated with one another (see the table of FIG. 3). It is desired that the present-state database 2 should have a client-data table (see FIG. 4). The client-data table shows the name, address, account number and the like of each client, which identify the client. These data items are extracted in response to an inquiry request supplied from the service-content referring section 3 and are then supplied to the transaction-service log database 1. Note that the transaction-service log database 1 and the present-state database 2 may be identical in system configuration.

As FIG. 1 shows, the database-updating section D comprises a client P/L calculating section 4, a rank-up item extracting section 6, a rank-up item determining section 9, and a rank-updating section 10. The client P/L calculating section 4 calculates the ratio of profit to the loss (P/L), which are recorded for a preset period in connection with each client. The rank-up item extracting section 6 extracts any service that can be raised in terms of rank in accordance with the relation between its ID (service ID) and a reference P/L value. The rank-up item determining section 9 presents at least one service ID, or a candidate service that has been extracted by the section 6 and can have its rank raised. The section 9 determines at least one service ID from the user's decision. The rank-updating section 10 raises the rank of the service item the rank-up item determining section 9 has determined.

The personal-account managing apparatus A according to this invention has a candidate-selecting section E that determines a plurality of candidate ranks for each personal ID, from the receipt data and the payment data. The candidate-selecting section E is a conceptual entity that is incorporated in the database-updating section D.

A direct-mail printing section 11 is connected to the rank-up item determining section 9.

Figures 3, 4, 5:
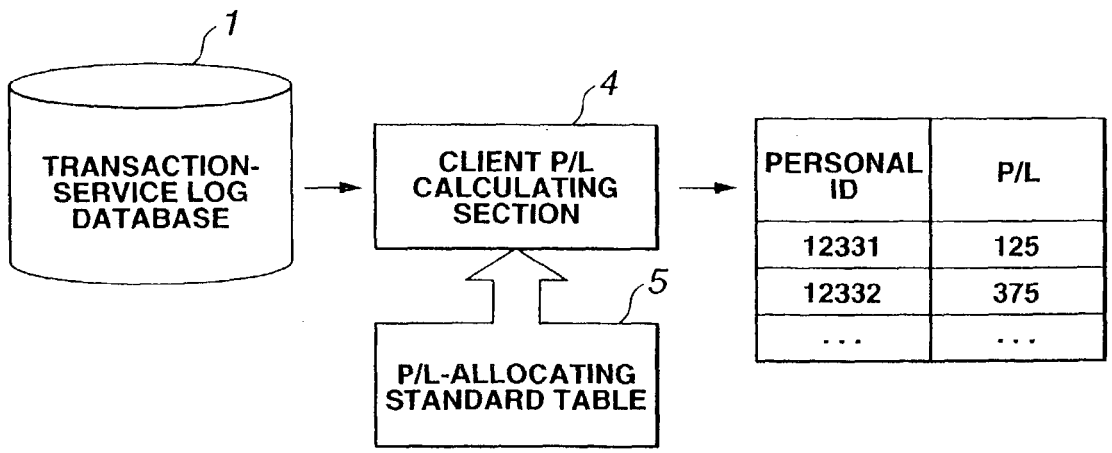
FIG. 3 is a table showing the balance in a client's account, which is acquired from the present-state database incorporated in the personal-account apparatus of the invention.
FIG. 4 is a table showing the information about clients, which is acquired from the present-state database incorporated in the personal-account managing apparatus according to this invention.
FIG. 5 is a block diagram depicting the major components of the personal-account managing apparatus, including the client P/L calculating section of the present invention.

The client P/L calculating section 4 will be described below. The section 4 receives data from the transaction-service log database 1 and data from an P/L-allocating standard table 5, which will be described later. The section 4 determines losses and profits made for the preset period in connection with each client, from the data supplied from the transaction-service log database 1 and the data supplied from an P/L-allocating standard table 5 as is illustrated in FIG. 5. (The losses are the costs a financial institution needs to bear, and the profits are the incomes the institution obtains.) The section 4 then calculates the ratio of total profit (P) to total loss (L), i.e., a P/L value for each client.

The P/L-allocating standard table 5, which plays an important role in the client P/L calculating section 4, will be described in detail. The P/L-allocating standard table 5 is a table that shows a method (i.e., standard) of allocating the P/L values concerning all activities the financial institution performs, to the clients of the financial institution. The table 5 can be replaced by a table of functions.

The P/L-allocating standard table 5 is composed of two sub-tables illustrated in FIGS. 9 and 10, respectively. The sub-table of FIG. 9 shows the standard of allocating to the clients the profits (P) the financial institution has obtained. The sub-table of FIG. 10 shows the standard of allocating to the clients the losses (L) the institution needs to bear. Either sub-table records items to be allocated, service items, and calculation formulae, and the like.

First, the standard of allocating the profits (P) to the clients will be explained. The profits to be allocated include, for example, the income resulting from the deposits, the interest on loans and the charges for various services.

Among the income resulting from the deposits are, for example, ordinary deposits in the yen, fixed deposits in the yen, ordinary deposits in any foreign currency, and fixed deposits in any foreign currency, and the like. Specific formulae are prescribed to calculate these items of income.

More specifically, the income resulting from an ordinary yen-deposit is calculated by using the formula of "latest balance×latest in-house rate O/N (Over Night), for each month." The income resulting from a fixed yen-deposit is obtained by using the formula of "principal×contracted date PV (Present Value) of the rate applied to the period." The income resulting from an ordinary deposits in any foreign currency is calculated by using the formula of "the latest balance×latest in-house rate O/N×latest TTB (Telegraphic Transfer Rate)." The income resulting from a fixed deposit in any foreign currency is calculated by using the formulate of "principal×contract date PV (Present Value) of the rate applied to the period×TTB for the contract date."

The interest of loans and the charges for various services are calculated by applying the various calculation formulae that have been prepared for the respective service items.

That is, the interest on a loan is calculated by using the formula of "latest balance×latest interest rate applied to the client" that has been prepared for an item "card loan." Further, the interest on a housing loan to which a fixed rate is applied, the interest on a housing loan to which a floating rate is applied, and the like are calculated by using the formulae written for the respective service items.

Among the charges for various services to which P/L values will be allocated are: charge for remittance, charge for using an ATM (Automatic Teller Machine), charge for issuing an transaction statement, and the like. Particular data items have been formulated to calculate "actual charges", respectively.

The standard of allocating the loss (L) to the clients will be explained. The losses to be allocated include, for example, the payment of the interests on the deposits, the payment of interests on loans, the costs related to assets, the labor costs, the system-running costs, the facility costs, the communications line costs, and the like.

Among the interests, which the financial institution needs to pay, are, for example, the interests on ordinary deposits in the yen, those on ordinary deposits in any foreign currency, and the like. Particular data items formulated to calculate these interests are "interest multiplier" and "If total amount: erase PL value for the service item; if a partial amount: erase the total amount temporarily."

The interests on loans, which the financial institution must play, include the fixed interests on loans and the floating interests on loans. Specific data items have been formulated to calculate these interests.

The costs related to assets include the reserve at the Bank of Japan, premiums for deposits, guarantee fee, premiums for collective insurance, credit-related costs. Specific data items have been formulated to calculate these asset-related costs.

Among the labor costs are: the cost involving the credit examination, the payment to the operators at call centers, the system cost in the system department, the legal cost at compliance, the cost in the general-affair department, the cost in the accounting department, the cost of market research, the cost of calculating risk in risk management, the cost of using assets in the market, and the like. Particular data items have been formulate to calculate these labor costs.

The system-running costs (cost of developing hardware and software, cost of maintaining the system) are classified into major categories, such as channel cost, business cost, market cost, service cost, examination cost, credit cost, and EC cost. Each major category is divided into minor categories. The channel cost, for example, is divided into costs for member Web, i-mode (trademark of KKNTT Docomo), mails, received databases, call centers, ATMs and the like. Specific data items have been formulated to calculate these costs.

The data item for calculating the cost for the member Web, for example, is "number of accesses to Web×charge (calculated at 70% of the data-processing capacity)." The cost for i-mode is "number of i-mode accesses×charge." The cost for ATMs is "number of uses×charge (including the charge for checking the balance)."

The facility costs relate to, for example, all facilities in the head office. Specific data items have been formulated to calculate the various facility costs, respectively.

The communication line costs include the cost for channels dedicated for Web hosting and i-mode and the in-house use of public lines. The communication line costs further include minor categories, such as advertisement fee, the cost of ATMs, foreign exchange fee, statement fee, admittance fee, card fee, examination data fee, fees involving loans, credit fee, information fee, personnel costs, fees paid for particular service, taxes, and the like. Specific data items have been formulated to calculate these costs.

The rank-up item extracting section 6 will be described. The rank-up item extracting section 6 receives data from the client P/L calculating section 5 and exchanges information with a rank-up table 8 and the rank database 7.

The rank-up table 8 is a table that shows the relation between the service items (service IDs), on the one hand, and the reference P/L value used to raise the ranks of these service items. The table 8 can be replaced by a table of functions. The reference P/L value indicates the lowest rank any service item may have, from which the service item will be raised to a higher rank.

The rank-up item extracting section 6 retrieves the contents of the rank-up table 8, in accordance with the client P/L values, and extracts the services that can be raised to higher ranks for the clients, respectively.

More precisely, the rank-up item extracting section 6 refers to the rank-up table 8 that records service IDs and reference P/L values, which are associated with one another as is illustrated in FIG. 6. The rank-up table 8 records the ranks valid at present for the respective clients and the "to ranks" to which the services should be raised.

The service IDs can each identify a financial service and the charge for financial service. Various financial services are offered to clients. Among these services are: one-moth fixed deposit, two-month fixed deposit, three-month fixed deposit and so on, all in the yen; one-month fixed deposit, two-month fixed deposit, three-month fixed deposit and so on, all in any foreign currency; card loans; loans for specific purposes; and housing loans. There are various charges, which are foreign exchange commission, domestic exchange commission, ATM-use charge (deposit-withdrawing charge), annual fee for credit card, issuance fee, account-maintaining fee, investment trust commission, and the like. The term "services" used here means not only the so-called "financial services," but also various commissions.

The rank-up item determining section 9 will be described. The section 9 is connected to the rank-up item extracting section 6. It is also connected to a special service table 13, too. The section 9 first refers to the special service table 13 (to be described later), with regard to any service item that the rank-up item extracting section 6 has extracted for any client. The section 9 then shows the contents of the service items extracted, including the interest, charge and the like for each item that are offered at special rates. Seeing the contents of the service items, the client selects at least one of the service items. The section 9 records any service item that the client has selected.

The rank-up item determining section 9 can be connected to the client side data terminals 12a, 12b, . . . via the Internet or the like. If this is the case, the section 9 can send e-mails to the clients, showing each client the service items that can be raised in terms of their rank or the charges that the client must pay for these service items. Assume that the client selects one of the service items shown to him or her and sends an e-mail. Then, the rank-up item determining section 9 receives the e-mail and records the service item the client has selected.

The rank-up item determining section 9 is connected to the present-state database 2 and the direct-mail printing section 11, too. The section 9 retrieves the name and address associated with the personal ID, in accordance with the information recorded in the client-data table (see FIG. 4) incorporated in the present-state database 2. Based on the data retrieved, the direct-mail printing section 11 prints the name and address. The section 11 also prints said at least one of the service items, which have been extracted by the rank-up item extracting section 9 and which may be raised in terms of their rank. Thus, the section 11 can send a direct mail.

In this case, the rank-up item determining section 9 has an input means. The input means can receive the mail from the client, whereby the section 9 can record the contents of the mail (at least one service item, and the like) send from the client.

The rank-updating section 10 will be described. The rank-updating section 10 is connected to the rank-up item determining section 9. It is connected to the rank database 7, too. The section 10 updates the data stored in the rank database 7, raising the rank of the service item identified by at least one service ID that is contained in the mail the rank-up item determining section 9 has received from the client.

The service-content referring section 3 will be explained. The service-content referring section 3 is connected to the transaction-service log database 1 and the present-state database 2. The section 3 is connected to the rank database 7 and the special service table 13, as well. The section 3 stores transaction information concerning each client, including the service item ID, rank, interest, charge and the like.

As seen from FIG. 8, the special service table 13 is a table that shows the interests, charges and the like related to the service items that are offered to the client at special rates. The table 13 can be replaced by a table of functions.

The special service table 13 shows the interests, charges and the like, in one-to-one relation to the service items of various ranks. The interest and charge that the client needs to pay for each service he or she receives are determined in accordance with the rank of the service.

How the personal-account managing apparatus A operates will be explained below.

Assume that a client, Mr. Taro Sone, has a transaction with the financial enterprise that utilizes the personal-account managing apparatus A. (In this instance, the transaction is an ordinary yen-deposit.) Then, the present-state database 2 stores the personal ID of Taro Sone, the client, and the present balance of his account.

The personal ID of Mr. Taro Sone is "12331." The transaction-service log database 1 stores data about the financial transaction Mr. Taro Sone (having personal ID of "12331"). (The data includes the date of transaction, type thereof, deposit or withdrawing, and the reason therefor, and like.) The client P/L calculating section 4 demands that the data about any transaction Mr. Taro Sone, whose personal ID is "12331," had during a preset period (e.g., November) should be extracted from the transaction-service log database 1.

In response to the demand, record Nos. 1101 and 1102 are extracted from the transaction-service log database 1.

The personal ID, "12331," exists in the record No. 1-104, too. However, the client P/L calculating section 4 does not pertains to the preset period. The personal ID is therefore excluded.

Assume that Mr. Taro Sone who has the personal ID of "12331" deposits or withdraws money via an ATM during the ordinary transaction hours, and no charge is imposed on the use of the ATM. Let us further assume that he does not anything else during these hours, for example, not asking any questions to the operator at the call center.

Hence, the client P/L calculating section 4 calculates the P/L value for the client whose personal ID is "12331", from various data items recorded in the P/L-allocating standard table 5. These data items include: the formula of "latest balance×latest in-house rate O/N, for each month" for calculating the ordinary yen-deposit, i.e., a standard of allocating the profits (P) to the clients; the "interest multiplier" for calculating the ordinary yen-deposit, i.e., a standard of allocating the loss (L) to the clients; the "number of uses×charge" for calculating the charge for the use of ATM lines, i.e., another a standard of allocating the loss (L) to the clients; and the "unit charge" applied to all accounts.

FIG. 2 shows only the data items relating to the amounts actually deposited and withdrawn. Therefore, nothing but the record Nos. 1101 and 1102 can be extracted. Nevertheless, other data items can be extracted, if necessary. This is because the transaction-service log database 1 stores all transaction history data that is indispensable to the calculation of the P/L value for each client. That is, the client P/L calculating section 4 can obtain the data necessary for calculating the P/L value, from the transaction-service log database 1, P/L-allocating standard table 5 and present-state database 2, and can therefore calculate the P/L value for the client.

Assume that the client P/L calculating section 4 has calculated a P/L value of "125" for the client whose personal ID is "12331," and that the rank database 7 records rank "C" for the personal ID "12331" at present. Let us further assume that the ordinary yen-deposit, which the client, Mr. Taro Sone whose personal ID is "12331" has at present, has service ID of "1."

In this case, the rank-up item extracting section 6 refers to the rank database 7 and extracts therefrom the data showing that the service that the client having personal ID of "12331" is receiving has rank "C" at present. The section 6 refers to the rank-up table 8, too, and extracts the IDs of all service items that can be raised in terms of rank, as is illustrated in FIG. 6.

FIG. 6 shows two records. The first record indicates that the service item having the ID of "1" is set at rank "C" and that a standard P/L value of "20" must be applied to raise the service item to rank "B." The second record indicates that the service item having the ID of "1" is set at rank "C" and that a standard P/L value of "50" must be applied to make the rank of the service item jump to rank "A."

The table has the information about the service item having ID of "2," in addition to the information about the service item having ID of "1." This enables the client to select a candidate rank from more choices than otherwise, in order to change, for example, an ordinary yen-deposit to a fixed yen-deposit.

As table shows, the When Mr. Taro Sone who is a client having the personal ID of "12331" receives the service having ID of "2" for the first time, the service is at rank "C" based on the present P/L value for this client. To raise the service item to, for example, rank "B," it is necessary to apply a standard P/L value of "50." In order to receive the service at rank "A" from the beginning, it is necessary to apply a standard P/L value of "120."

The rank-up item extracting section 6 thus extracts the IDs of the service items that can be raised to any higher rank. The rank-up item determining section 9 receives the IDs of these service items. If the section 9 is connected to the client side data terminals 12a, 12b, . . . via the Internet or the like, it transmits at least one of the service items that can be raised to higher ranks. The display device on any data terminal that receives the service items displays the service items.

Seeing the service items thus displayed, the client selects at least one of the service items. The client then sends an e-mail to the rank-up item determining section 9. The section 9 receives the e-mail.

As described above, the rank-up item determining section 9 is connected to the direct-mail printing section 11. The direct-mail printing section 11 retrieves the name and address associated with the personal ID and some other data, in accordance with the information recorded in the present-state database 2 (see FIG. 4). Based on the data retrieved, the direct-mail printing section 11 prints the name and address and the other data. The name and address and the other data are sent in the form of an e-mail.

In this case, the input means provided in the rank-up item determining section 9 inputs the data sent from the client who has read the direct mail (i.e., the data representing at least one service item the client has selected). Thus, the rank-up item determining section 9 receives the data sent from the client.

The rank-updating section 10 updates said at least one service ID based on the data that the rank-up item determining section 9 has received from the client. The section 10 updates the latest rank data associated with said at least one service ID and stored in the rank database 7. (See FIG. 7.)

How the client P/L calculating section 4 calculates P/L values for the respective clients will be explained in detail, with reference to FIGS. 12 to 14. More precisely, it will be described how the section 4 calculates P/L values for a one-moth period from October 1 to October 31.

FIG. 12 is a table showing various financial transaction models that are used to calculate P/L values for the respective clients. In the case shown in FIG. 12, three events are assumed. First, a client who has already opened an account for an ordinary yen-deposit enters into a contract for a fixed 3-million yen deposit at an interest rate of 2%. Second, the client gets a card-loan of 0.2 million yen. Third, the client has used the ATM, made inquiries at the call center and accessed the Web site provided by the financial institution, as is indicated in FIG. 12. Note that these states of using the ATM, the call center and the Web site are the parameters that influence the P/L value for this client.

FIG. 13 shows the history of the transactions that the client has made for the one-moth period, in the manner illustrated in FIG. 12. The P/L values are calculated for the respective clients on the basis of the history for the period from October 1 to October 31. Nonetheless, they may be calculated based on an transaction history for a period either shorter or longer than the one-month period.

The transaction history illustrated in FIG. 13 is composed of events, each identified by the date of transaction, the type of transaction and a data item related to the transaction. As the history shows, on October 1 the client deposited 10 million yen on October 1 at the ATM into his ordinary deposit account. On October 1, the client accessed the membership site provided by the financial institution. On October 1, too, the client got a card-loan of 0.2 million yen. The data representing these events can be acquired from a transaction-statement database 105, a client-balance database 106 and an operation log database 107.

How to calculate a P/L value for a client will be explained with reference to FIG. 14.

FIG. 14 shows the results of the calculation performed on the data items which have been extracted from the tables shown in FIG. 9 and FIG. 10 and which concern the financial transactions specified in FIG. 12. It should recalled that the table of FIG. 9 shows the standard of allocating to the clients the profits (P), whereas the table of FIG. 10 shows the standard of allocating to the clients the losses (L).

The formulae shown in FIG. 14 have been prepared to calculate the profit and loss the financial institution has in the transactions with the client and to add the profits and the losses the institution has during the preset period. Note that the profit and loss are calculated day by day, on the assumption that every year has 365 day.

The calculations are not limited to the formulae shown here. Rather, the financial institution that offers special service to the client can use any other formulae desired.

A method of calculating a profit from each client will be explained with reference to FIG. 14.

The "profit from each client" is the profit that the financial institution obtains from the transactions performed with the client during the preset period, in contrast to the P/L value for client that the sum of the total profit and the total loss, each recorded for that preset period.

As mentioned above, the client has opened an account for an ordinary yen-deposit. The financial institution uses the money the client has deposited for the period from October 1 to October 31, in various ways, making a profit for the financial institution. The profit that the client enables the institution to make can be calculated from the day-by-day deposit at the client's account. Namely, the "profit from each client" can be thus calculated.

As FIG. 14 shows, the "interest on an ordinary yen-deposit" is calculated by the following formula (1):

$$\text{Latest balance} \times \text{in-house rate O/N} \times (\text{last day of the calculation period} - \text{fist day thereof}) \qquad (1)$$

The profit from each client, regarding the service item "interest on an ordinary yen-deposit," is calculated by multiplying the balance during a period from October 1 to October 31, by the rate applied to this deposit. The balance is obtained from the transaction history shown in FIG. 13. Thus, the profit is found as follows:

$$(10 \text{ million yen} \times 0.0001\%) \times (\text{October 10-October 2}) + (7 \text{ million yen} \times 0.001\%) \times (\text{October 15-October 11}) + (5 \text{ million yen} \times 0.001\%) \times (\text{October 20-October 16}) + (4.7 \text{ million yen} \times 0.001\%) \times (\text{October 31-October 21}) = 175 \text{ yen} \quad (2)$$

That is, the profit the institution earns from the service item "interest on an ordinary yen-deposit" is 175 yen.

Similarly, as shown in FIG. 14, the service item "interest on a fixed yen-deposit" is calculated by the following formula (3):

$$(\text{Principal} \times \text{in-house annual rate agreed on the contract date} \div 365) \times (\text{last day of the calculation period} - \text{fist day thereof}) \quad (3)$$

The profit from each client, regarding the service item "interest on a fixed yen-deposit," is calculated by using the formula (3), in accordance with the transaction history shown in FIG. 13. Thus, this profit is given as follows:

$$(3 \text{ million yen} \times 3\% \div 365) \times (\text{October 31-October 11}) = 4,932 \text{ yen} \quad (4)$$

That is, the profit the institution earns from the service item "interest on a fixed yen-deposit" is 4,932 yen. Note that the annual rate of interest presented to the client is 2%, whereas the in-house annual rate applied to this deposit is 3%.

Similarly, the profit from each client, regarding the service item "card loan" is, for example, 36 yen, if calculated in accordance with the formula shown in FIG. 14.

Of the profit from each client, any service charge is regarded as a pure profit.

The charge for using the ATM may be set at 105 yen. The transaction history of FIG. 13 shows that the client has used the ATM three times. Hence, the profit from the service item "charge for the use of ATM" is given as follows:

$$105 \text{ yen} \times 3 = 315 \text{ yen} \quad (5)$$

The profits from each client, regarding the various service items, are added together. The total profit from each client is thereby calculated. In this particular instance, the total profit is 5,458 yen.

A method of calculating a loss from each client will be explained with reference to FIG. 14.

The "loss due to each client" is the loss made during the preset period, in contrast to the P/L value for client, i.e., the sum of the total profit and the total loss, each recorded for that preset period.

The client has already opened an account for an ordinary yen-deposit. The financial institution needs to pay the client an interest on the money that the client has deposited and remained in the client's account for the period from October 1 to October 31. The interest paid is a loss to the financial institution. The interest to be paid to the client can be calculated from the amount deposited, day by day, at the client's account.

Like the profit from each client, the loss due to each client can be calculated by the formula shown in FIG. 14, with reference to the transaction history shown in FIG. 13. That is, this loss is calculated from the formula for calculating the service items "interest on ordinary yen-deposits," "interest on fixed yen-deposits" and "card loans."

As shown in FIG. 14, the loss due to each client may be allocated to the total loss of the financial institution or a part thereof. Of the cost related to the reserve at the Bank of Japan (one of the asset-related costs), for example, the cost related to the fixed deposit is allocated to the client at a fixed ratio.

Since the client uses a card loan, the guarantee fee paid for the card loan is allocated to the client, too.

The labor cost at the financial institution may be allocated to the clients. As the transaction history of FIG. 13 reveals, the client makes an inquiry to the call center on October 30. Hence, the loss due to the client is calculated for the service item "the operator at the call center" as is illustrated in FIG. 14.

The cost concerning the service item "the operator at the call center" is calculated by the following formula that is shown in FIG. 14:

Telephoning time($ACD+ACW$)×(unit cost of operator+ $SV$ fee)×correction coefficient

EXAMPLE

Unit cost of operator=5000 yen $SV$ fee=1000 yen $$\text{Correction coefficient} = 1.1 \quad (6)$$

Hence, the cost concerning the operator at the call center is given by the following equation (7):

$$(30 \text{ min.} + 10 \text{ min.}) \times (5000 \text{ yen} + 1,000 \text{ yen}) \times 1.1 = 4,400 \text{ yen} \quad (7)$$

The loss due to the client in connection with the service item "interest on a fixed yen-deposit" is therefore 4,400 yen.

The telephoning time ACD is the time the operator is talking with the client over telephone. The telephoning time ACW is the time the operator spends on a clerical work after talking with the client, thereby to meet the client's request.

The unit cost of operator is the payment by the hour to the operator. The SV (SuperVisor) fee is a part of the payment by the hour to a supervisor who gives technical advises to, for example, ten operators including the operator in question.

The correction coefficient is applied to adjust the cost concerning the operator minutely.

The system-running cost at that the financial institution may be allocated to the clients, too.

In the case shown in FIG. 14, the cost of the accesses to the membership Web site of the financial institution, the cost for using of IVR (Interactive Voice Response), the cost for using the ATM, and similar costs are allocated to the clients. These costs are therefore calculated as losses due to the clients.

The losses due to each client, which have been calculated as described above, are added together. The loss value due to each client is thereby obtained. In this specific case, the loss value due to the client is 31,047 yen.

The profit and the loss, both calculated regarding the client, are added as shown in the following equations (8) and (9), thereby to calculate the P/L value for the client:

$$\text{Profit} + \text{loss} = P/L \text{ value} \quad (8)$$

$$5,458 \text{ yen} + (-31,047 \text{ yen}) = -25,589 \text{ yen} \quad (9)$$

As in this particular case, the P/L value for each client may be of a negative value, depending on the standard the financial institution adopts to allocate P/L value to the clients and the current management state the financial institution assumes at present.

In the present embodiment, the yen is used as standard currency for the P/L values. Hence, the P/L value for any client who has an ordinary or fixed deposit in a foreign currency may be first calculated in terms of the foreign currency and then converted to the equivalent value in the yen, by applying the prescribed exchange rate.

The P/L value may be calculated in the dollar or the euro used as standard currency.

Hitherto, a method of calculating the P/L value for each client has been explained in conjunction with the present embodiment. The rank of any special service item may be determined from only the profit and loss that have been calculated in the process of obtaining the P/L value.

The service items that are used to calculate the P/L value for each client are not limited to those disclosed in this specification. Rather, other service items can be utilized to calculate the P/L value.

The second embodiment of the present invention will be described. Generally it is demanded that banks should offer different special service items, not the same special service item, to different clients in accordance with the personal information about the clients and the history of financial transactions concerning each client. Even today, banks offer a special service to a client on the birthday of the client, in accordance with the birthday data acquired when the client opened an account at the bank. They add a special service when they recommend a new financial service to a person who is coming of age. They increase the rate of interest on the deposit of a client if the transaction history of the client shows that his or her deposit exceeds a preset value.

In view of this, the present invention provides a special-service providing apparatus. The special-service providing apparatus, which is the second embodiment of the invention, can offer a special service to any client, based not only on the P/L value for the client, but also on the personal data items about the client and the history of financial transactions with the client.

Figure 15:
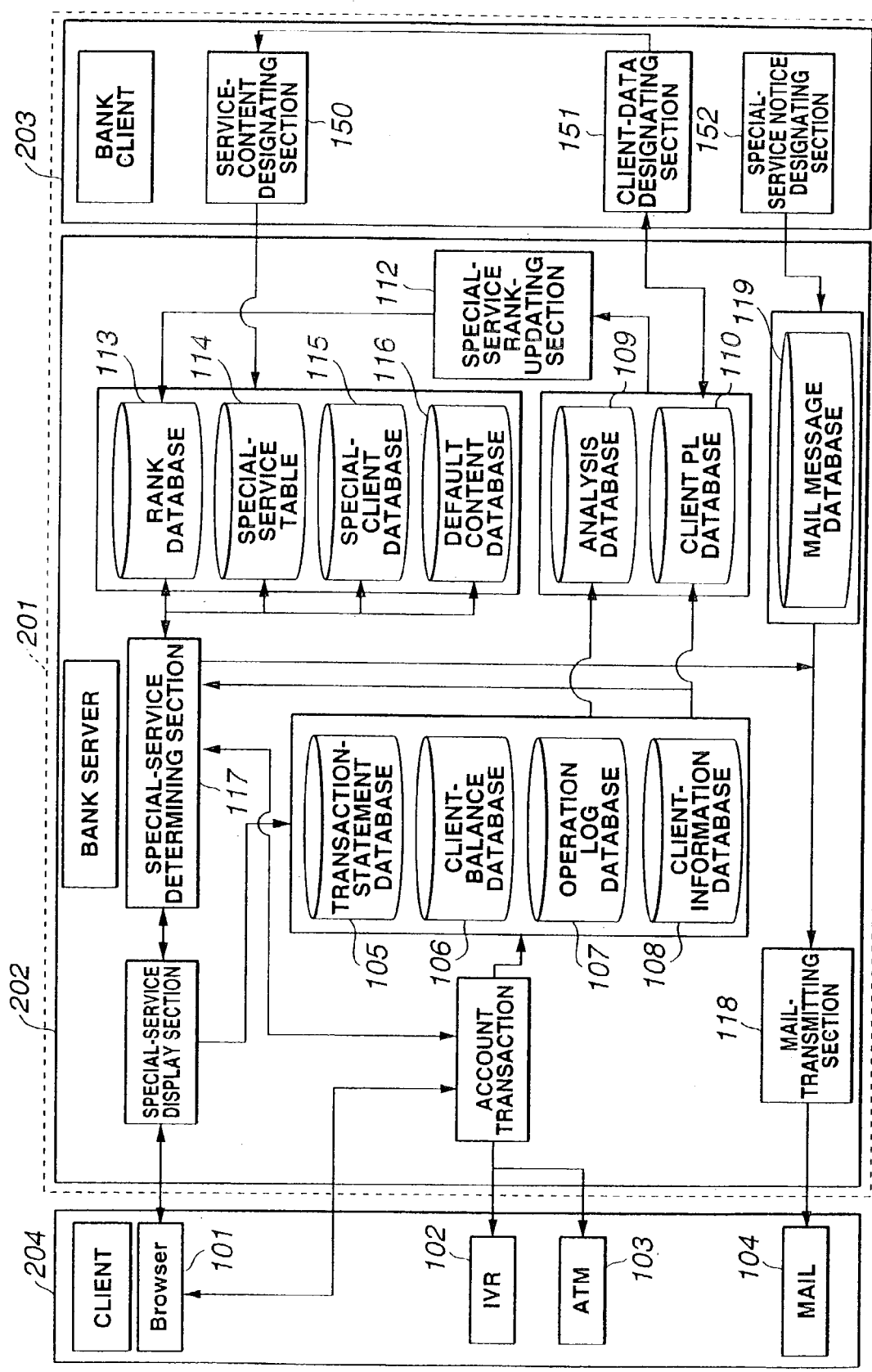
FIG. 15 is a block diagram showing the entire construction of a special-service providing apparatus according to the present invention.
Figure 17:
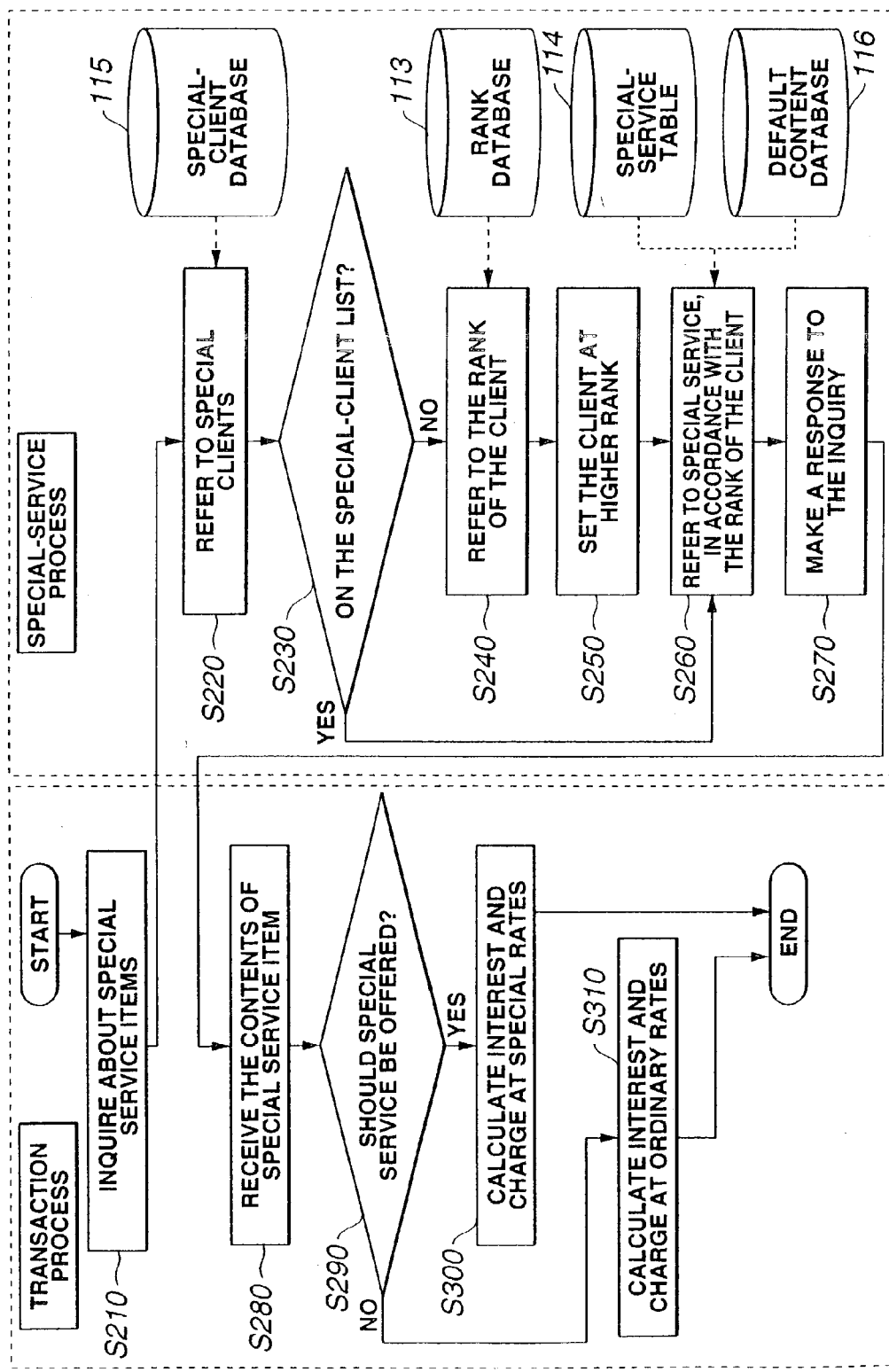
FIG. 17 is a flowchart explaining the operation of the special-service providing apparatus according to the invention.

How the second embodiment offers special services to clients will be explained, with reference to FIGS. 15 to 17. FIG. 15 is a function-block diagram of the special-service providing apparatus according to the second embodiment.

The special-service providing apparatus 201 comprises a bank client terminal 203 and a bank server 202. The bank client terminal 203 designs special services to offer to clients and offer the special services designed. The bank server 202 manages various databases and the like.

The bank server 202 comprises a storage section, a ROM (Read Only Memory), a RAM (Random Access Memory), an input/output section, a central control section and a communications control section, which are not shown in FIG. 15. The central control section unit executes the program stored in the storage section, whereby the bank server 202 has such function blocks as are shown in FIG. 15.

The storage section is a fixed disk or the like. It stores a database, an updating program, a communications program, and other programs for proving special services to the clients. The database records the personal information of the clients and the balances of the clients' accounts. The updating program updates the log file of transactions (depositing and withdrawing at and from each account) and the balances at the accounts, which are recorded in the database. The communications program enables the bank system to communicate with the systems of other banks, processes the transmitting remittance data transmitted from the other banks and transmits remittance data to the other banks.

The ROM stores the operating system (OS) and other basic programs.

The RAM reads any program from stored in the storage section, stores the same temporarily and provides a working memory to enable the central control section (CPU) to operate.

The central control section incorporates a CPU and controls the other components of the special-service providing apparatus 201 in accordance with the programs stored in the storage section. More specifically, the central control section controls the input/output section, causing the same to input and output data, and rewrites or updates the account balances recorded in the database, and maintains the communication between the apparatus 201 and any external system.

The communications control section connects the apparatus 201 to the system of any other bank through the communication line available. The communications control section cooperates with the central control section to make the apparatus 201 communicate with any external system, receive receipt data, transmit remittance data and inform each client of the special service that can be offered to the client.

The special-service providing apparatus 201 acquires transaction statements, the operation logs of the clients, the data about the clients, and the like. As mentioned above, the apparatus 201 comprises a bank client terminal 203 and a bank server 202. The bank server 202 can analyze the data items acquired, calculate the PL values for the respective clients and update the ranks of the clients in accordance with the PL values. Additionally, the bank server 202 can determine the contents of special services to be offered to the respective clients and can inform the clients of the special services determined. The bank client terminal 203 can perform clerical works. More precisely, the bank client terminal 203 can examine the data to be stored in the bank server 202 and can register, change and delete the contents of special service that the bank offers to the clients. The bank client terminal 203 can record the history of the transactions with the clients, so that the history may be used in marketing. Moreover, the bank client terminal 203 can prepare and register newsletters showing the special services in detail.

The bank server 202 comprises a transaction-statement database 105. The transaction-statement database 105 is a database that records a log of all financial transactions performed between the clients and the bank.

Any client may perform a financial transaction with the bank by accessing Web 101, by using an IVR (Interactive Voice Response) 102 or by using an ATM (Automatic Teller Machine) 103. The IVR is a computer system that can automatically make oral responses through the telephone. It reproduces recorded oral messages when the caller operates the telephone dial, thus receiving a transaction request.

The transaction-statement database 105 acquires all data about the financial transaction, which indicates how the transaction request has been made, by accessing Web 101, by using the IVR or by using the ATM.

The client-balance database 106 stores the balance data that represents the account balances of the clients identified by personal IDs. The balance data of each client includes data items that represent the balances of an ordinary yen-deposit, a fixed yen-deposit, an ordinary foreign-currency deposit, a fixed foreign-currency deposit, and any other financial service. These data items are updated as the bank performs financial transactions with the client.

The operation log database 107 records what operations each client has performed to the financial institution. More specifically, the section 107 records how many times the client accesses the bank server 202 during a preset period, which screen the client accesses after the log-in, what operation the client performs on the screen accessed and how long the total cession time is.

Moreover, the section 107 records the number of times the client uses the call center and how long the client uses the call center each time during a preset period. The bank can therefore acquire not only receipt data and payment data, but also other data indispensable for calculating the P/L value for the client.

The bank server 202 further comprises a client-information database 108. The section 108 records the personal information about each client, which was acquired when the client opened an account at the bank. The main items of the personal information are the account number, branch number, name, address, telephone number, sex, mail address, occupation and the like.

The transaction-statement database 105, client-balance database 106, operation log database 107 and client-information database 108 record the data items of the types that are stored in the transaction-service log database 1 and present-state database 2 of the first embodiment.

The bank server 202 has an analysis database 109. This database 109 collects the data items recorded in the transaction-statement database 105, client-balance database 106, operation log database 107 and client-information database 108. In the analysis database 109, the data items are managed in association with the respective clients.

The data items recorded in the analysis database 109 are used, mainly for marketing analysis. The database 109 contains tables corresponding to the clients, respectively. The tables are of the type shown in FIG. 16. As FIG. 16 shows, each table contains various items. Among these items are; the number of accesses to the WEB; the WEB-cession time; the number of times the client has used the credit card; the number of times the client has used the ATM; the number of transactions on the ordinary foreign-currency account; and the number of times the client has failed to repay loan by the due date.

The contents of the analysis database 109 can be displayed by a client-transaction displaying section 151, which will be described later.

The bank server 202 has a client PL database 110. The client PL database 110 stores the P/L values for the clients, which have been calculated from the data items recorded in the transaction-statement database 105, client-balance database 106, operation log database 107 and client-information database 108.

The bank server 202 further comprises a special-service rank-updating section 112. The section 112 updates the rank of each client in accordance with the data items stored in the analysis database 109 and client PL database 110. The client's rank, thus updated by the special-service rank-updating section 112, is stored in a rank database 113 that will be described later. The client's rank is updated in some cases, at regular intervals on the basis of the client P/L value. It may be also updated if the client purchases a campaigned financial service or if the balance of the client's account exceeds a prescribed amount.

The rank database 113 is equivalent to the rank database 7 incorporated in the first embodiment. The database 113 contains tables of the type illustrated in FIG. 11.

The rank database 113 stores the clients' ranks that the special-service rank-updating section 112 has updated. The clients' ranks may be over-written to the latest ones. Alternatively, the latest rank of each client may be stored, along with the previously stored ones. In the case where the rank database 113 stores a plurality of ranks of each client, which can be applied during a preset period, the special service corresponding to the highest rank stored can be offered to the client.

The bank server 202 has a special-service table 114. This table 114 is equivalent to the special service table 13 that is shown in FIG. 1. The table 114 is of the type illustrated in FIG. 8.

The special-service table 114 is a table that shows the relation between the rank of each service item and the contents of a special service associated with the service item. The special-service table 114 can be replaced by a table of functions.

As can be seen from FIG. 8, the special-service table 114 shows the interests, charges and the like related to the service items that are offered to the client at special rates. The interests and charges to be applied to the transactions with each client are determined from the rank of the client, by referring to the special-service table 114.

The numerical data held in the special-service table 114 may represent, for example, the profit the client can get in terms of interest, i.e., the difference between the special rate of interest and the standard rate of interest. Alternatively, the numerical data may represent the absolute value of interest calculated by applying that special rate.

The bank server 202 further comprises a special-client database 115, which stores the information about clients to whom no special services can be offered for specific reasons, such as failure in repaying loan by the due date. Thus, the bank will not offer special services to any client who is registered in the special-client database 115. Nor will the bank inform such clients of the special services that can be offered to other clients.

Clients can be registered in the special-client database 115 via a client-data designating section 151 (later described), by using the information stored in the analysis database 109 and the like.

The bank server 202 has a default content database 116. This database 116 holds the contents of service (e.g., interest rates and charges) offered to new clients and special clients at default rank. The clients at the default rank are unable to receive any special service. The special-service table 114 and the default content database 116 may be combined to form a single database.

The bank server 202 further comprises a special-service determining section 117. The section 117 refers to the special-service table 114 and determines the special service that can be offered to each client, from the rank which is stored in the rank database 113 and which the client holds in connection with each service ID.

The special-service determining section 117 performs a process to specify information about any client who cannot receive special service specified by the special-client database 115, so that no special service is offered to such a client.

The special-service determining section 117 apply the default rank registered in the default content database 116, to any client who has not ever transacted with the bank. Based on this default rank and the contents of the default content database 116, the section 117 determines the special service that can be offered to the new client.

The bank server 20 has a mail-transmitting section 118. This section 118 transmits main messages about a campaigned special service, to the mail addresses of the clients who can meet the qualifications and receive the special service in advertising campaign.

The section 118 can acquire a specific mail message from a mail message database 119 and transmits the same to the mail address of the client, thereby to inform the client of the contents of a special service that the client can receive.

The bank client terminal 203 installed in the bank comprises a CPU, a storage section, a RAM, a ROM, a communications control section, a keyboard, a display and the like, not shown in FIG. 15. The CPU executes a particular program stored in the storage section so that the bank client terminal 203 has the function blocks shown in FIG. 15.

In the bank client terminal 203, a service-content designating section 150 can register, change and delete the data held in the rank database 113, special-service table 114, special-client database 115 and default content database 116.

For example, the service-content designating section 150 may registers a new special service item in the special-service table 114. Further, the section 150 may set the date on which the bank starts applying the interest rate brackets for the respective ranks, the maximum number of times each client can receive the special service, the charges for the special services, and the like. The section 150 may input personal IDs, each identifying a client. The section 150 can therefore delete the name of the client from the list of clients who cannot receive any special service. Moreover, the service-content designating section 150 can change the contents of the special services, which are stored in the default content database 116 and which can be offered to the clients at the default rank.

The client-transaction displaying section 151 can register, change and delete the data that is held in the analysis database 109 or the client PL database 110.

The client-transaction displaying section 151 can look into the analysis database 109 to achieve market researches and can sort the data items in association with the various table items. Therefore, the section 151 can help analyze the trend of client demands. In addition, the section 151 can change the contents of the analysis database 109 on the basis of the results of analysis.

The bank server 202 further comprises a special-service notifying section 152. The section 152 can register, change and delete the data that is held in a mail message database 119.

The special-service notifying section 152 can prepare, for example, an advertisement for use in a campaign for special services and can register the advertisement into the mail message database 119.

Special services can be notified to the clients not only by transmitting mail messages, but also by displaying the messages on membership Web screens (no shown) or on the bill of the ATM transactions.

The special-service providing apparatus operates as will be explained with reference to the flowchart of FIG. 17. FIG. 17 illustrates two processes. One is a transaction process, and the other is a special-service process. It will be described how the apparatus 201 determines whether a financial institution should offer a special service to a client when the client makes a transaction with the financial institution.

At Step S210, the special-service providing apparatus 201 receives an inquiry of a client who logged himself at the membership site after entering into a contract concerning a service item. The inquiry may be as to whether the financial institution may offer him a special treat in connection with the service item. The apparatus 201 can receive an inquiry about a possible reduction of charge for the use of an ATM, from a client who has used the ATM.

At Step S220, the special-service determining section 117 refers to the data held in the special-client database 115 by using the personal ID of the client, thereby determining whether the client is one of the special clients. As indicated above, "special clients" are those who cannot receive any special service because, for example, he has delayed repayment of a loan.

At Step S230, the special-service determining section 117 determines, from the result of the decision made at Step S220, whether the client is listed in the special-client database 115. If the client is listed in the database 115 (that is, if YES at Step S230), the process jump to Step S260. At Step S260, the section 117 refers to the special service, if any, that can be offered to the client. If the client is not listed in the database 115 (that is, if NO at Step S230), the process goes to Step S240. At Step S240, the section 117 refers to the rank of the client.

At Step S240, the special-service determining section 117 refers to the rank database 113. The section 117 can extract the data item representing the rank the client holds at present, because the rank database 113 stores the service IDs and the ranks associated to these IDs as is illustrated in FIG. 11.

At Step S250, the special-service determining section 117 sets a rank for the service item stored in the rank database 113. If the database 113 stores a plurality of ranks for the service item, the section 117 selects and sets the highest rank. The section 117 may set, for the client, different ranks regarding the same service ID, each being valid for only a specific period. In such a case, the highest of the ranks will be applied.

The rank determined from the P/L value calculated for the client and valid for a specific period may differ from the rank determined from the conditions for offering a special service during the specific period. If this is the case, the section 117 sets the higher of these ranks.

At Step S260, the special-service determining section 117 searches for the special service that corresponds to the rank of the client. That is, based on the rank of the client, the section 117 refers to the contents of the special-service table 114, which are shown in FIG. 8, or searches the default content database 116 for a default rank. As for new clients and the special clients, the section 117 refers to the default content database 116.

At Step S270, the results obtained at the special-service providing apparatus 201 are applied to the transaction process.

At Step S280, the contents of the special service item contracted, which have been inquired about, are obtained.

At Step S290, it is determined whether the contents of the special service should be notified to the client. If it is determined that the contents should be notified (that is, if YES at Step S290), the process goes to Step S300. At Step S300, the contents of the special service (i.e., reduced interest and reduced charge) are calculated. If it is determined that the contents should not notified (that is, if NO at Step S290), the process goes to Step S310. At Step S310, the contents of a non-special service (i.e., standard interest and standard charge) are calculated, and the process is terminated.

The criterion for the decision made at Step S290 is not limited. Nonetheless, any client cannot receive any special service if he has used the ATM three times, free of charge, during the special-service period, though he is still a client entitled to special services. That is, the decision made at Step S290 is NO, and the contents of a non-special service are calculated.

Thus, the special-service providing apparatus 201 according to this embodiment can provide special services of different types to different clients, in accordance with the personal information and transaction history of each client.

INDUSTRIAL APPLICABILITY

As has been described, the present invention makes it possible to reliably record the financial transactions of each client, the history of operations the client has performed to a financial institution and the like, correctly evaluate the contribution of each client to the financial institution in terms of profit, and to offer each client services as much advantageous to the client as possible, such as a special interest rate and a reduction in charges, thereby to meet various needs OF the client.

The invention claimed is:

1. An apparatus for managing personal accounts, comprising:
   a database storing a personal identification number corresponding to an individual, rank data, and service identification numbers;
   a profit/loss calculating section configured to calculate an individual profit/loss value based on profits and losses attributed to the individual, the calculation being based on at least: a profit from use of a deposit account, a profit from interest on a loan, a loss from payment of interest on a deposit, and a loss from a payment of interest on a loan;
   an item extracting section comprising a computer processor and memory configured to:
      perform a first determining step of determining whether an assigned rank of a first service corresponding to the personal identification number, initially set to a rank of the individual corresponding to the personal identification number, can be raised to a first higher rank by applying at least a portion of the individual profit/loss value corresponding to a rank-raise profit/loss value associated with the first service toward raising the rank of the first service, such that the individual profit/loss value is correspondingly adjusted, wherein the first higher rank is higher than a present rank of the first service,
      perform a second determining step of determining whether an assigned rank of a second service corresponding to the personal identification number, initially set to the rank of the individual corresponding to the personal identification number, can be raised to the first higher rank by applying at least a portion of the individual profit/loss value corresponding to a rank-raise profit/loss value associated with the second service toward raising the rank of the second service, such that the individual profit/loss value is correspondingly adjusted,
      extract the first service when the result of the first determining step is positive and;
      extract the second service when the result of the second determining step is positive;
   an item determining section configured to set the assigned rank of the first service to the first higher rank for a first period and to set the assigned rank of the second service to the first higher rank for the first period; and
   a rank-updating section configured to raise the rank of at least one of the first service and the second service based on a selection by the individual of at least one of the first service and the second service from a plurality of services presented to the individual.

2. The apparatus according to claim 1, wherein the rank data comprises a data item composed of the rank and the service identification number corresponding to the rank.

3. A computer readable non-transitory storage medium having a program for causing, when executed by a computer processor, a computer to execute a method for managing personal accounts, the method comprising:
   storing a personal identification number corresponding to an individual, rank data, and service identification numbers;
   calculating, by the processor, an individual profit/loss value corresponding to the personal identification number based on profits and losses attributed to the individual, the calculation being based on at least: a profit from use of a deposit account, a profit from interest on a loan, a loss from payment of interest on a deposit, and a loss from a payment of interest on a loan;
   determining, by the processor, in a first step, whether an assigned rank of a first service corresponding to the personal identification number, initially set to a rank of the individual corresponding to the personal identification number, can be raised to a first higher rank by applying at least a portion of the individual profit/loss value corresponding to a rank-raise profit/loss value associated with the first service toward raising the rank of the first service, such that the individual profit/loss value is correspondingly adjusted, wherein the first higher rank is higher than a present rank of the first service,
   determining, by the processor, in a second step, whether an assigned rank of a second service corresponding to the personal identification number, initially set to the rank of the individual corresponding to the personal identification number, can be raised to the first higher rank by applying at least a portion of the individual profit/loss value corresponding to a rank-raise profit/loss value associated with the second service toward raising the rank of the second service, such that the individual profit/loss value is correspondingly adjusted;
   extracting the first service and setting the rank of the first service to the first higher rank for a first period when the first determining step is positive;
   extracting the second service and setting the rank of the second service to the first higher rank for the first period when the second determining step is positive;
   receiving a selection, made by the individual, of at least one of the first service and the second service from a plurality of services presented to the individual;
   recording the selection; and
   raising the rank of at least one of the first service and the second service based on the selection.

4. A method for managing personal accounts, comprising:
   storing, by a server comprising a computer processor and memory, a personal identification number corresponding to an individual, rank data, and service identification numbers;
   calculating, by the server, an individual profit/loss value corresponding to the personal identification number based on profits and losses attributed to the individual, the calculation being based on at least: a profit from use of a deposit account, a profit from interest on a loan, a loss from payment of interest on a deposit, and a loss from a payment of interest on a loan;
   determining, by the server, in a first step, whether an assigned rank of a first service corresponding to the personal identification number, initially set to a rank of the individual corresponding to the personal identification number, can be raised to a first higher rank by applying at least a portion of the individual profit/loss value corresponding to a rank-raise profit/loss value associated with the first service toward raising the rank of the first service, such that the individual profit/loss value is correspondingly adjusted, wherein the first higher rank is higher than a present rank of the first service,
   determining, by the server, in a second step, whether an assigned rank of a second service corresponding to the personal identification number, initially set to the rank of the individual corresponding to the personal identification number, can be raised to the first higher rank by applying at least a portion of the individual profit/loss value corresponding to a rank-raise profit/loss value associated with the second service toward raising the rank of the second service, such that the individual profit/loss value is correspondingly adjusted;

extracting, by the server, the first service and setting the assigned rank of the first service to the first higher rank for a first period when the first determining step is positive;

extracting, by the server, the second service and setting the assigned rank of the second service to the first higher rank for the first period when the second determining step is positive;

receiving a selection, made by the individual, of at least one of the first service and the second service from a plurality of services presented to the individual;

recording the selection; and raising the rank of at least one of the first service and the second service based on the selection.

5. The apparatus according to claim 1,
wherein the rank of the first service is raised, based on a selection, to the first higher rank when the individual profit/loss value is equal to or greater than a first standard profit/loss value corresponding to the first service identification number, wherein the rank of the first service is raised, based on the selection, to a second higher rank when the individual profit/loss value is equal to or greater than a second standard profit/loss value corresponding to the first service identification number, wherein the rank of the second service is raised, based on the selection, to the first higher rank when the individual profit/loss value is equal to or greater than a third standard profit/loss value corresponding to the second service identification number, and wherein the rank of the second service is raised, based on the selection, to the second higher rank when the individual profit/loss value is equal to or greater than a fourth standard profit/loss value corresponding to the second service identification number.

6. The computer readable non-transitory storage medium according to claim 3,
wherein the rank of the first service is raised, based on a selection, to the first higher rank when the individual profit/loss value is equal to or greater than a first standard profit/loss value corresponding to the first service identification number, wherein the rank of the first service is raised, based on the selection, to a second higher rank when the individual profit/loss is equal to or greater than a second standard profit/loss value corresponding to the first service identification number, wherein the rank of the second service is raised, based on the selection, to the first higher rank when the individual profit/loss value is equal to or greater than a third standard profit/loss value corresponding to the second service identification number, and wherein the rank of the second service is raised, based on the selection, to the second higher rank when the individual profit/loss value is equal to or greater than a fourth standard profit/loss value corresponding to the second service identification number.

7. The method according to claim 4,
wherein the first service is raised, based on a selection, to the first higher rank when the individual profit/loss value is equal to or greater than a first standard profit/loss value corresponding to the first service identification number, wherein the first service is raised, based on the selection, to a second higher rank when the individual profit/loss value is equal to or greater than a second standard profit/loss value corresponding to the first service identification number, wherein the second service is raised, based on the selection, to the first higher rank when the individual profit/loss value is equal to or greater than a third standard profit/loss value corresponding to the second service identification number, and wherein the second service is raised, based on the selection, to the second higher rank when the individual profit/loss value is equal to or greater than a fourth standard profit/loss value corresponding to the second service identification number.

8. The apparatus according to claim 1, wherein the first higher rank is represented by a first symbol and a second higher rank is represented by a second symbol.

9. The apparatus according to claim 1,
wherein performing the first determining step further comprises determining whether the rank of the first service can be raised to a second higher rank based on the relation between the first service identification number and the individual profit/loss value, wherein the second higher rank is higher than the first higher rank, and wherein performing the second determining step further comprises determining whether the rank of the second service can be raised to the second higher rank based on the relation between the second service identification number and the individual profit/loss value.

10. The computer readable non-transitory storage medium according to claim 3,
wherein determining in the first step further comprises determining whether the rank of the first service can be raised to a second higher rank based on the relation between the first service identification number and the individual profit/loss value, wherein the second higher rank is higher than the first higher rank, and wherein determining in the second step further comprises determining whether the rank of the second service can be raised to the second higher rank based on the relation between the second service identification number and the individual profit/loss value.

11. The method according to claim 4,
wherein determining in the first step further comprises determining whether the rank of the first service can be raised to a second higher rank based on the relation between the first service identification number and the individual profit/loss value, wherein the second higher rank is higher than the first higher rank, and wherein determining in the second step further comprises determining whether the rank of the second service can be raised to the second higher rank based on the relation between the second service identification number and the individual profit/loss value.

* * * * *